United States Patent
Vincelette

(10) Patent No.: US 7,171,077 B2
(45) Date of Patent: Jan. 30, 2007

(54) PACKAGE FOR TEMPERATURE SENSITIVE OPTICAL DEVICE

(75) Inventor: André R. Vincelette, Rouyn-Noranda (CA)

(73) Assignee: LXSIX Photonics Inc., Ville St-Laurent (CA)

( * ) Notice: Subject to any disclaimer, the term of this patent is extended or adjusted under 35 U.S.C. 154(b) by 295 days.

(21) Appl. No.: 10/814,129

(22) Filed: Apr. 1, 2004

(65) Prior Publication Data

US 2004/0218861 A1    Nov. 4, 2004

Related U.S. Application Data

(60) Provisional application No. 60/459,631, filed on Apr. 3, 2003.

(51) Int. Cl.
  *G02B 6/34* (2006.01)
(52) U.S. Cl. ...................................... 385/37
(58) Field of Classification Search .................. None
  See application file for complete search history.

(56) References Cited

U.S. PATENT DOCUMENTS

| | | | |
|---|---|---|---|
| 4,923,278 A | 5/1990 | Kashyap et al. |
| 5,042,898 A | 8/1991 | Morey et al. |
| 5,694,503 A | 12/1997 | Fleming et al. |
| 5,703,978 A | 12/1997 | DiGiovanni et al. |
| 5,719,974 A | 2/1998 | Kashyap |
| 5,757,540 A | 5/1998 | Judkins et al. |
| 5,841,920 A | 11/1998 | Lemaire et al. |
| 5,844,667 A | 12/1998 | Maron |
| 5,914,972 A | 6/1999 | Siala et al. |
| 5,938,811 A | 8/1999 | Greene |
| 6,011,886 A | 1/2000 | Abramov et al. |
| 6,044,189 A | 3/2000 | Miller |
| 6,067,392 A | 5/2000 | Wakami et al. |
| 6,087,280 A | 7/2000 | Beall et al. |
| 6,101,301 A | 8/2000 | Engelberth et al. |
| 6,108,470 A | 8/2000 | Jin et al. |
| 6,112,553 A | 9/2000 | Poignant et al. |
| 6,144,789 A | 11/2000 | Engelberth et al. |
| 6,147,341 A | 11/2000 | Lemaire et al. |
| 6,148,128 A | 11/2000 | Jin et al. |
| 6,175,674 B1 | 1/2001 | Lin |
| 6,181,851 B1 | 1/2001 | Pan et al. |
| 6,187,700 B1 | 2/2001 | Merkel |
| 6,198,868 B1 | 3/2001 | Jang |
| 6,209,352 B1 | 4/2001 | Beall et al. |
| 6,233,382 B1 | 5/2001 | Olson et al. |
| 6,233,386 B1 | 5/2001 | Paek et al. |
| 6,236,782 B1 | 5/2001 | Kewitsch et al. |
| 6,240,225 B1 | 5/2001 | Prohaska |
| 6,243,527 B1 | 6/2001 | Dawson-Elli |
| 6,258,743 B1 | 7/2001 | Fleming et al. |
| 6,295,399 B1 | 9/2001 | Engelberth |

(Continued)

*Primary Examiner*—John D. Lee
*Assistant Examiner*—Mike Stahl

(57) ABSTRACT

A package for holding a temperature sensitive optical device. The package includes a substrate, and a first link connecting to the optical device at a first attachment point, and connecting to the substrate at a location remote from the first attachment point. The package also includes a second link connecting to the optical device at a second attachment point that is remote from the first attachment point, the second link connecting to the substrate at a location remote from the second attachment point. The substrate, the first and the second links imposing a strain variation to the optical device in dependence of temperature.

21 Claims, 3 Drawing Sheets

U.S. PATENT DOCUMENTS

| | | |
|---|---|---|
| 6,317,528 B1 | 11/2001 | Gadkaree et al. |
| 6,327,405 B1 | 12/2001 | Leyva et al. |
| 6,349,165 B1 | 2/2002 | Lock |
| 6,362,118 B1 | 3/2002 | Beall et al. |
| 6,370,310 B1 | 4/2002 | Jin et al. |
| 6,374,015 B1 | 4/2002 | Lin |
| 6,377,727 B1 | 4/2002 | Dariotis et al. |
| 6,377,729 B2 | 4/2002 | Merkel |
| 6,393,181 B1 | 5/2002 | Bulman et al. |
| 6,396,982 B1 | 5/2002 | Lin |
| 6,400,884 B1 | 6/2002 | Matano et al. |
| 6,403,511 B2 | 6/2002 | Fleming et al. |
| 6,449,293 B1 | 9/2002 | Pedersen et al. |
| 6,449,402 B1 | 9/2002 | Bettman et al. |
| 6,453,092 B1 | 9/2002 | Trentelman |
| 6,453,108 B1 | 9/2002 | Sirkis |
| 6,466,716 B1 | 10/2002 | Ogle |
| 6,477,299 B1 | 11/2002 | Beall et al. |
| 6,477,309 B2 | 11/2002 | So |
| 6,490,394 B1 | 12/2002 | Beall et al. |
| 6,493,486 B1 | 12/2002 | Chen |
| 2001/0021292 A1 | 9/2001 | Merkel |
| 2001/0031692 A1 | 10/2001 | Fleming et al. |
| 2002/0090174 A1 | 7/2002 | Girardon et al. |
| 2002/0141700 A1 | 10/2002 | Lachance et al. |
| 2002/0146226 A1 | 10/2002 | Davis et al. |
| 2002/0146230 A1 | 10/2002 | So |
| 2002/0150335 A1 | 10/2002 | Lachance et al. |
| 2002/0181908 A1 | 12/2002 | Pedersen et al. |
| 2003/0039448 A1* | 2/2003 | Ting et al. .................. 385/43 |

* cited by examiner

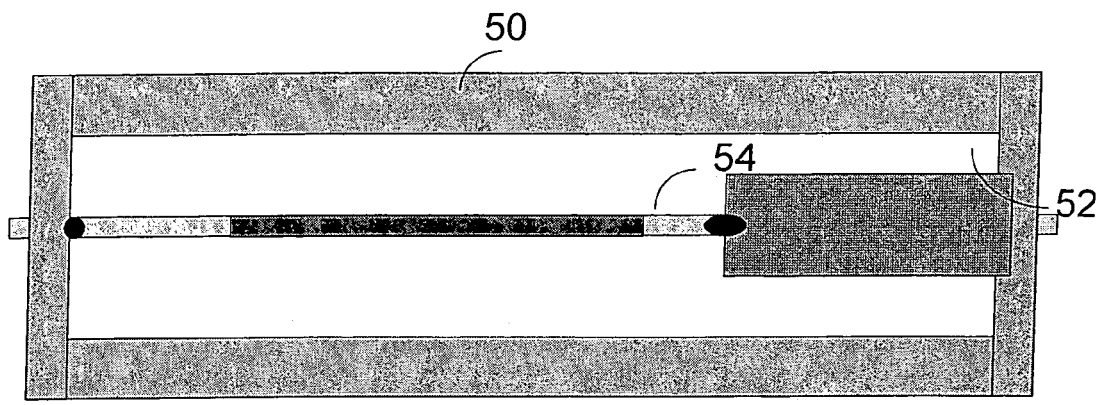
Fig. 1 - Prior Art
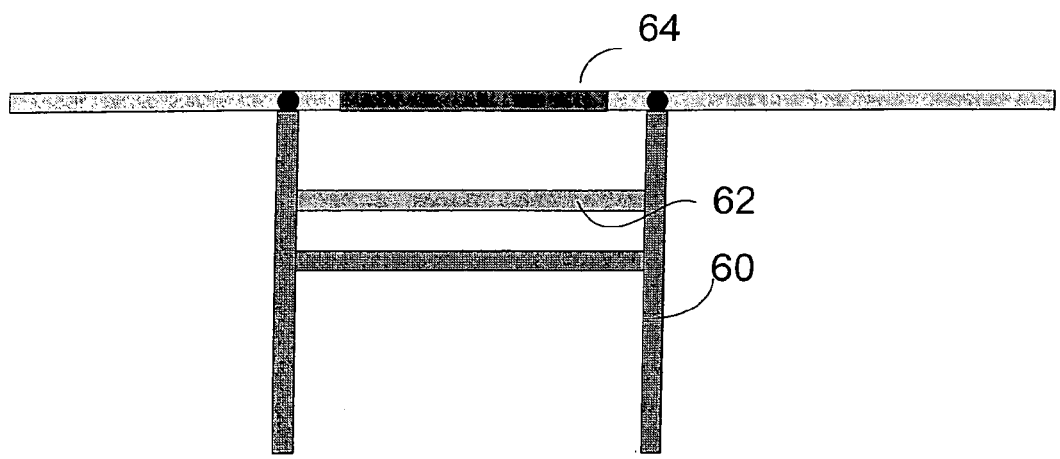
Fig. 2 - Prior Art

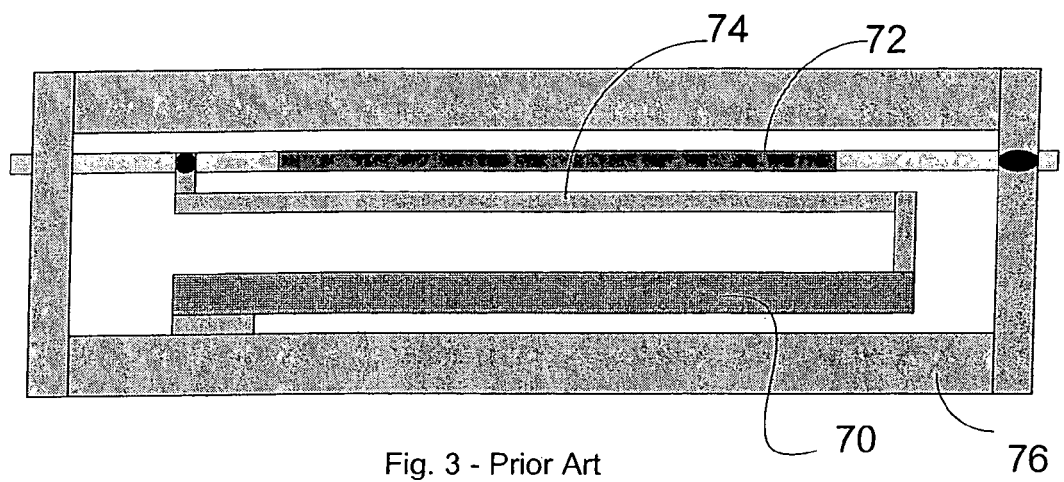
Fig. 3 - Prior Art
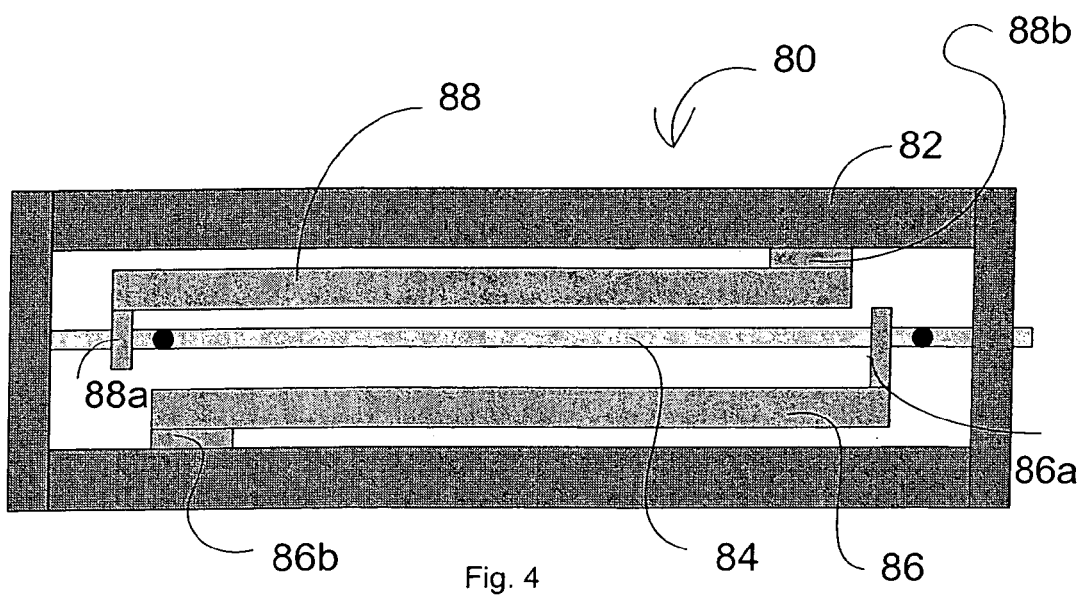
Fig. 4

PACKAGE FOR TEMPERATURE SENSITIVE OPTICAL DEVICE

CROSS-REFERENCE TO RELATED APPLICATION

This application claims the benefit under 35 USC 119(e) of U.S. Provisional Patent Application No. 60/459,631 filed on Apr. 3, 2003 and hereby incorporated by reference herein.

FIELD OF THE INVENTION

The present invention relates generally to packaging of optical devices that are temperature sensitive. More specifically, the present invention provides a package and a method for packaging an optical device, such as an optical fiber including a grating.

BACKGROUND OF THE INVENTION

An optical waveguide, such as an optical fiber is formed by a core section conveying the light signal, and a cladding section that surrounds the core to confine the light signal to the core. The light signal remains captive in the core by virtue of the difference between the refractive indexes of the core and the cladding sections and their geometries. In an optical fiber, the core section is cylindrical and the cladding surrounding it is tubular and in contact with the cylindrical core.

A fiber Bragg grating is an axial periodical change of the effective refractive index (n) that induce harmonic back reflection of the light component at a certain wavelength ($\lambda$), called the Bragg wavelength. The Bragg wavelength is related to the period length ($\Lambda$) of the effective index change by:

$$\lambda = 2n\Lambda \qquad (1)$$

Variations of the Bragg wavelength due to the effects of the temperature (T) and strain ($\epsilon$) can be calculated by the derivative of eq. 1:

$$\Delta\lambda/\lambda = [(1/n)dn/dT + (1/\Lambda)d\Lambda/dT]\Delta T + [1 + (1/n)dn/d\epsilon]\Delta\epsilon \qquad (2)$$

$$\Delta\lambda/\lambda = (\zeta + \alpha_f)\Delta T + (1 + p_e)\Delta\epsilon \qquad (3)$$

where the thermo-optic coefficient for the fiber material, $\zeta = [(1/n)dn/dT]$; the coefficient of thermal expansion (CTE) of the fiber material, $\alpha_f = (1/\Lambda)d\Lambda/dT$; and the photo-elastic constant, $p_e = -(1/n) dn/d\epsilon$.

This dependence of the Bragg wavelength on temperature and strain is sometimes useful in applications such as temperature and/or stress sensors. But for other applications, such as channel filtering of DWDM communication system, the Bragg wavelength must be kept constant for all environmental conditions. Consequently, various packaging have been developed in the past to maintain Bragg wavelength constant in changing environmental conditions. Active packages using energy to control the temperature and/or the strain of the Bragg grating are relatively expensive, require access to energy source and often need active monitoring of the Bragg wavelength reflection. To overcome this drawback, various passive package designs using the strain dependency of the Bragg wavelength to counterbalance its dependency to temperature have been proposed. These passive a thermal packages mostly use a mechanical structure to which the Bragg grating is fixed at a set tension and that would naturally impose to this Bragg grating a strain variation in function of the temperature according to the following equation:

$$\Delta\epsilon/\Delta T = -(\zeta + \alpha_f)/(1 + p_e) \qquad (4)$$

Using eq. 4 to replace $\Delta\epsilon$ in eq. 3, we obtain:

$$\Delta\lambda/\lambda = (\zeta + \alpha_f)\Delta T + (1 + p_e)[-(\zeta + \alpha_f)/(1 + p_e)]\Delta T = 0 \qquad (5)$$

The first category of those passive a thermal package designs is shown in FIG. 1 and it uses a combination of two materials with different coefficients of thermal expansion (CTE). The material having the lower CTE ($\alpha_{low}$) serves as a substrate 50, while the material having the higher CTE ($\alpha_{high}$) serves as a thermal compensator 52. One end of the Bragg grating 54 is fixed to one end of the thermal compensator 52; the Bragg grating and the thermal compensator 52 are fixed in series to the substrate 50 at the other end. As the temperature increases, the thermal expansion of the thermal compensator 52 will push on the Bragg grating 54, decreasing its strain; inversely, as the temperature decreases, the thermal compensator 52 contracts and increases the strain in the Bragg grating. The strain variations in the Bragg grating can be expressed by the following equation:

$$\Delta\epsilon/\Delta T = (L_{subs}\alpha_{low} - L_{comp}\alpha_{high})/(L_{subs} - L_{comp}) \qquad (6)$$

where $L_{subs}$ is the length of the substrate 50 and $L_{comp}$ is the length of the thermal compensator 52. Different athermal package designs using the serial thermal compensator mounting are described in the following US patents and US patent applications:

| Patents or applications number | Date of grant/ publication | Inventors |
| --- | --- | --- |
| 5042898 | Aug. 27, 1991 | Morey et al. |
| 5844667 | Dec. 1, 1998 | Maron et al. |
| 5914972 | Jun. 22, 1999 | Siala et al. |
| 6112553 | Sep. 5, 2000 | Poignant et al. |
| 6374015 | Apr. 16, 2002 | Lin |
| 6377727 | Apr. 23, 2002 | Dariotis et al. |
| 6393181 | May 21, 2002 | Bulman et al. |
| 2002/0141700 | Oct. 3, 2002 | Lachance et al. |
| 2002/0146226 | Oct. 10, 2002 | Davis et al. |
| 2002/0150335 | Oct. 17, 2002 | Lachance et al. |

This serial configuration arrangement has a number of drawbacks. Firstly, it increases the length of the device, which makes it unsuitable for applications where component footprint and density are important factors. Secondly, since the thermal compensator is located on only one side of the Bragg grating, when the device is placed in a thermal gradient environment, the Bragg grating and its thermal compensator will be at different temperatures inducing an offset in the resulting Bragg wavelength. This could be a major concern when these devices are used in photo-electronic modules where a lot of heat is generated locally at proximity of the devices.

Another popular configuration is the cantilever design, shown at FIG. 2. This approach also uses two materials with different CTEs, one as a substrate 60, the other for the thermal compensator 62. Both sides of the Bragg grating 64 are fixed at a set tension on top of the arms of a substrate 60 having an H shape. The thermal compensator 62 is fixed to the substrate arms parallel to the Bragg grating 64. If the thermal compensator 62 is placed in the upper arms section of the H shaped substrate 60, its CTE should be lower than the substrate; if it is placed in the lower section, its CTE should be higher than the substrate. Strain variations in the Bragg grating can be defined as follows:

$$\Delta\epsilon/\Delta T = H_{Bragg}(L_{subs}\alpha_{subs} - L_{comp}\alpha_{comp})/(H_{comp}L_{Bragg}) \qquad (7)$$

where $H_{comp}$ is the parallel distance between the substrate 60 and the thermal compensator 62, and $H_{Bragg}$ is the shortest of the parallel distance between the Bragg grating 64 and either the substrate 60 or the thermal compensator 62. Different athermal package designs using the cantilever thermal compensator mounting are described in U.S. Pat. Nos. 5,841,920, 6,044,189, 6,144,789, 6,175,674, 6,181, 851, 6,295,399, 6,327,405, 6,370,310, 6,396,982 and 6,453, 108. The cantilever configuration is also subject to thermal gradient offsets since the thermal compensator is located only at one side of the Bragg grating, but requires less footprint since it is parallel to the Bragg grating, instead of being in series with it. Also, by locating the thermal compensator close to the Bragg grating, the temperature gradient offsetting effect can by diminished, but not nullified.

| Patents or applications number | Date of grant/ publication | Inventors |
|---|---|---|
| 5841920 | Nov. 24, 1998 | Lemaire et al. |
| 6044189 | Mar. 28, 2000 | Miller |
| 6144789 | Nov. 7, 2000 | Engelberth et al. |
| 6175674 | Jan. 16, 2001 | Lin |
| 6181851 | Jan. 30, 2001 | Pan et al. |
| 6295399 | Sep. 25, 2001 | Engelberth |
| 6327405 | Dec. 4, 2001 | Leyva et al. |
| 6370310 | Apr. 9, 2002 | Jin et al. |
| 6396982 | May 28, 2002 | Lin |
| 6453108 | Sep. 17, 2002 | Sirkis |

By using a substrate with negative thermal expansion, the need for a thermal compensator can be eliminated. Moreover, by fixing the fiber directly on that substrate reduces the parallel distance between the thermal compensation element and Bragg grating, reducing, but not nullifying, offsetting effects induced by a temperature gradient. That is the approach discussed in the following US patents and US patent applications numbers:

| Patents or applications number | Date of grant/ publication | Inventors |
|---|---|---|
| 5694503 | Dec. 2, 1997 | Fleming et al. |
| 6087280 | Jul. 11, 2000 | Beall et al. |
| 6187700 | Feb. 13, 2001 | Merkel |
| 6209352 | Apr. 3, 2001 | Beall et al. |
| 6233382 | May 15, 2001 | Olson et al. |
| 6240225 | May 29, 2001 | Prohaska |
| 6258743 | Jul. 10, 2001 | Fleming et al. |
| 6317528 | Nov. 13, 2001 | Gadkaree et al. |
| 6362118 | Mar. 26, 2002 | Beall et al. |
| 6377729 | Apr. 23, 2002 | Merkel |
| 6400884 | Jun. 4, 2002 | Matano et al. |
| 6403511 | Jun. 11, 2002 | Fleming et al. |
| 6477299 | Nov. 5, 2002 | Beall et al. |
| 6477309 | Nov. 5, 2002 | So |
| 6490394 | Dec. 3, 2002 | Beall et al. |
| 2001/0021292 | Sep. 13, 2001 | Merkel |
| 2001/0031692 | Oct. 18, 2001 | Fleming et al. |
| 2002/0146230 | Oct. 10, 2002 | So |

Chemical composition and fabrication process of those substrates is critical to obtain the exactly matching negative CTE to compensate for thermal effects on the Bragg wavelength. In addition, those formulations must ensure repeatability, reproducibility and stability for all the operational conditions encountered by the devices. New formulations have to be developed for each change in fiber composition (chemical or geometrical) or Bragg grating exposure processes since these parameters will slightly change the Bragg wavelength dependency on temperature and strain. In this respect, U.S. Pat. No. 6,240,225 (Prohaska., May 29, 2001) proposes the use of an anisotropic negative substrate, where by changing the angle on which the Bragg grating is fixed to the substrate, the negative CTE can be adjusted for each type of fiber and grating.

In contrast to the serial and cantilever configurations discussed earlier which allow the possibility of fine tuning the Bragg wavelength after the fixing points are stabilized, the negative CTE substrate approach does not permit to readjust the Bragg. wavelength after curing and stabilization of the fiber anchoring points. Since those processes induce strain variation on the Bragg grating, they must be predictable and repeatable during the pre-tensioning for fiber fixation to insure acceptable yield.

U.S. Pat. No. 6,148,128 (Jin et al., Nov. 14, 2000) and U.S. Pat. No. 6,108,470 (Jin et al., Aug. 22, 2000) disclose yet a different athermal package design, using a negative thermal expansion substrate and a fine Bragg wavelength adjusting mechanism for post-assembly corrective tuning. These tuning mechanisms use programmable, latchable magnets to control gap distances between magnets due to magnetic force fields. In addition to increasing the cost of the package, the use of programmable, latchable magnets may cause some long-term reliability concerns resulting from changes of the magnetic properties of these magnets, as well as, changes of their equilibrium positions in the magnetic field as a result of mechanical shocks and vibrations. These patents, as well as U.S. Pat. No. 6,101,301 (Engelberth et al., Aug. 8, 2000) and U.S. Pat. No. 6,243,527 (Dawson-Elli, Jun. 5, 2001), also disclose another athermal configuration similar to the serial design, that is shown in FIG. 3. A thermal compensator 70 is parallel to the Bragg grating 72 and a low thermal expansion extension 74 is used to join the pushing end of the thermal compensator 70 to the pulled end of the Bragg grating 72. In this parallel configuration the thermal compensator 70 should have a higher CTE than the substrate 76; and since there is only one thermal compensator 70 on one side of the Bragg grating 72, it is sensitive to offsets due to a thermal gradient.

Tubular thermal compensator configurations covering the Bragg grating have also been proposed to avoid offsetting effects of temperature gradient. The most popular approach is to use a matching negative CTE coating material discussed in the following US patents/applications:

| Patents or applications number | Date of grant/ publication | Inventors |
|---|---|---|
| 4923278 | May 8, 1990 | Kashyap et al. |
| 6067392 | May 23, 2000 | Wakami et al. |
| 6233386 | May 15, 2001 | Pack et al. |
| 6466716 | Oct. 15, 2002 | Olge |
| 2002/0090174 | Jul. 11, 2002 | Girardon et al. |

This approach presents the same drawbacks as the negative thermal expansion substrate, repeatability, reliability and absence of fine-tuning mechanisms. U.S. Pat. No. 6,449, 293 (Pedersen et al., Sep. 10, 2002) and U.S. patent application Ser. No. 2002/01811908 (Pedersen et al., Dec. 5, 2002) propose to hold the Bragg grating between two negative matching thermal expansion substrates; an approach similar to negative CTE coating and which present the same major benefits and drawbacks. U.S. Pat. No. 6,147,341 (Lemaire et al., Nov. 14, 2000) discusses a tubular version of the cantilever configuration and U.S. Pat. No. 6,453,092 (Trentelman, Sep. 17, 2002) proposes a tubular version of the parallel configuration. U.S. Pat. No. 6,449,402 (Bettman et al., Sep. 10, 2002) also proposes a tubular version of the parallel configuration, as well as an axially symmetrical flat version of the parallel configuration. Both versions counteracts offsetting effects of thermal gradients without any mechanism for post-packaging fine-tuning, but the flat version is easier to assemble. Tubular versions usually require the Bragg grating to be threaded into the package, which limits the potential for automation of assembly, the length of the Bragg grating and makes difficult to produce multiple gratings in series along the same fiber. Another drawback of the tubular configuration is that since the grating is completely covered by the thermal compensator, it is impossible to deliver energy to it without affecting the thermal compensator; so, they are not compatible with grating writing on a pre-packaged fiber, nor to annealing or exposition tuning of the Bragg grating in a stabilized athermal package.

Another related art publication that is of interest to the present subject is U.S. Pat. No. 5,719,974 (Kashyap, Feb. 17, 1998) that proposes to cut open a window over an optical fiber laser diode's pigtail to enable laser writing of a Bragg grating on the fiber. U.S. Pat. No. 6,349,165 (Lock, Feb. 19, 2002) also proposes the use of two opposite windows cut on a tubular package to enable laser exposure of a pre-packaged fiber. The use of a matching negative CTE material to make the tube covering the Bragg grating, in which the two opposite windows are cut enables the athermalisation of the Bragg grating. Since the package is made of matching negative CTE material, it has the same drawbacks as all packages of that type, namely finding a formulation compatible with long term environmental stability and manufacturing repeatability. In addition, this package does not allow for post assembly tension fine tuning, nor for thermal compensation adjustment; and the tubular configuration requires fiber treading, which limits the automation potential and the use in serial athermal Bragg gratings applications. The energy beam must be strictly confined inside the windows apertures, otherwise the negative CTE material will absorb energy and contract, and so interfere with the grating formation; also, no method is provided to counteract the energy scattered by the fiber to reach and be absorbed by the negative CTE tube. U.S. Pat. No. 6,236,782 (Kewitsch et al., May 22, 2001) presents an athermal package for couplers comprising a Bragg grating in the waist region. The inert structure is designed to enable energy exposition of pre-packaged couplers, but no method is proposed to block scattering energy. The athermalisation is performed by a serially mounted thermal compensator, so it is subject to temperature gradient offsets. In addition, the requirement to tread the long structure is complex, rendering assembly automation difficult. Bragg wavelength and thermal compensation can be fine tuned after the grating is formed but not independently from one another.

SUMMARY OF THE INVENTION

In a first broad aspect, the invention provides a package for holding a temperature sensitive optical device. The package includes a substrate, and a first link connecting to the optical device at a first attachment point, and connecting to the substrate at a location remote from the first attachment point. The package also includes a second link connecting to the optical device at a second attachment point that is remote from the first attachment point, the second link connecting to the substrate at a location remote from the second attachment point. The substrate, the first and the second links imposing a strain variation to the optical device in dependence of temperature.

In a second broad aspect, the invention provides a package for holding a temperature sensitive optical device. The package has a substrate receiving the optical device and a thermally compensating component mounted to the optical device and to the substrate. The substrate has a window to allow the optical device to be exposed to optical energy electromagnetic radiation to change optical properties of the optical device.

In a third broad aspect, the invention provides a method for manufacturing a packaged optical component. The method comprises placing an optical component in a substrate, making a connection between a thermally compensating link and the optical component and stabilizing the connection. The method also includes exposing the optical component to optical energy electromagnetic radiation subsequent to the stabilizing to change an optical property of the optical component and affixing the thermally compensating component to the substrate subsequent to the exposing.

In a fourth broad aspect, the invention provides a method for manufacturing a packaged optical component. The method includes providing an optical component mounted on a substrate and a thermally compensating component link connected to the optical component. The method also includes exposing the optical component to optical energy electromagnetic radiation to change an optical property of the optical component and shielding the thermally compensating component from optical electromagnetic radiation scattered by the optical component during the exposing.

In a fifth broad aspect, the invention provides a method for manufacturing a packaged optical component. The method includes providing an optical component mounted on a substrate and a thermally compensating component link connected to the optical component. The method also includes exposing the optical component to optical energy electromagnetic radiation to change an optical property of the optical component. The thermally compensating component is located relative the optical component such that optical electromagnetic radiation scattered by the optical component during the exposing is precluded from causing the thermally compensating component to induce a strain in the optical component.

BRIEF DESCRIPTION OF THE DRAWINGS

A detailed description of examples of implementation of the present invention is provided hereinbelow with reference to the following drawings, in which:

FIG. 1 shows an athermal serial configuration package, according to the prior art;

FIG. 2 shows an athermal cantilever configuration package, according to the prior art;

FIG. 3 shows an athermal parallel configuration package, according to the prior art;

FIG. 4 is a view at a conceptual level of an optical device package according to a non-limiting example of the present invention;

Figure 5:
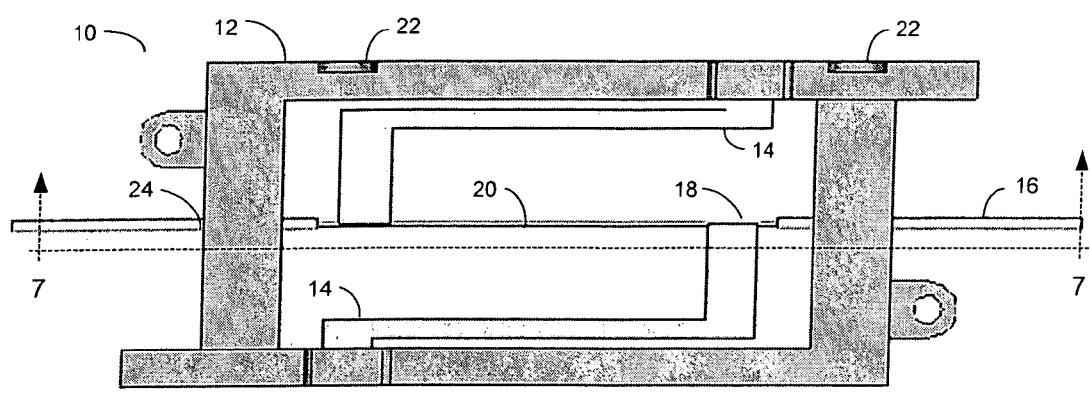
FIG. 5 is a detailed front elevational view of an optical device package according to a specific but non-limiting example of implementation of the present invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 4 shows at 80 a new configuration for athermal packaging which is capable of reversing the natural positive thermal expansion of the outside frame 82, into a negative thermal expansion for the fiber section containing the fiber grating. More specifically, the outside frame 82 defines an internal space for receiving a fiber 84 on which a grating such as a Bragg grating can be formed. The fiber 84 is attached to the expanding outside frame 82 by two links 86 and 88 made of material having a lower CTE than the CTE of the outside frame 82. Each link 86,88 attaches to the fiber 84 at a location past the point of attachment of the other link 86,88 to the outside frame 82.

The strain variations with temperature in the arrangement of FIG. 4 is given by:

$$\Delta\epsilon/\Delta T = (L_1\alpha_{link88} + L_2\alpha_{link86} - L_3\alpha_{frame82})/L_4 \quad (8)$$

where $L_1$, $L_2$, $L_3$, $L_4$ are respectively:
1. the axial distance between the junction points 88a and 88b of the link 88,
2. the axial distance between the junction points 86a and 86b of the link 86,
3. the axial distance between the junction points 86b and 88b on the outside frame 82,
4. and the axial distance between the junction points 86a and 88a on the fiber 84.

$\alpha_{link88}$, $\alpha_{link86}$, $\alpha_{frame82}$ are respectively the coefficients of thermal expansion (CTE) of the material of the link 88, of the link 86 and of the outside frame 82. The selection of materials and of the junction points positions are done so eq. 8 satisfies eq. 4, rendering the Bragg wavelength substantially insensitive to temperature variations:

$$(L_1\alpha_{link88} + L_2\alpha_{link86} - L_3\alpha_{frame82})/L_4 = -(\zeta + \alpha_f)/(1 + p_e) \quad (9)$$

As can be seen in eq. 9, this new configuration allows for seven parameters to adjust the package to fit the desired strain/temperature relationship, of which the four relative positions of the junction points. These four degrees of liberty on the position of the junction points enable independent fine tuning and adjustment of the strain level in the packaged section of the fiber, for Bragg wavelength, and strain slope as a function of the temperature, for fine tuning of the athermalisation; even if the two junction points to the glass fiber are already made and stabilized. Junction points to the glass fiber may be made by adhesive, such as glass solders and epoxies that OK require high temperature exposition, inducing stresses on the structures that would need relaxation, and/or curing completion; so these junctions should be stabilized. When this stabilization process is made on a strain fiber already mounted on the package, some fiber strain variations may occur. However, if the junction points to the fiber are stabilized before the assembly of the package, the strain level variations in the fiber grating due to curing completion or induced stresses relaxation are significantly reduced. This new configuration allows effecting the stabilization of the junction points to the fiber before mounting it to the package. Further more, since this configuration is compatible with writing the grating on a pre-packaged fiber, the adhesion processes to the fiber does not have to take into account its effects on the fiber grating since that grating can be effected after the adhesion is completed. Once the fiber is joined to the links in a stable manner, the links can be joined to the substrate. The junction points between the links and the substrate can be selected to obtain the desired strain level and strain thermal slope in the fiber grating. The stability of the junctions will depend on the materials, adhesive and process selection. Since the geometry of the structure can be arranged to adjust the thermal compensation for the fiber grating, material selection of the links and substrate can be made as a function of junction's stability, price, ease of processing etc.

The novel package configuration also allows optical frequency electromagnetic radiation such as a laser beam, to be delivered on the fiber without affecting the components of the package, enabling grating writing and annealing on a pre-packaged fiber. Since there is no functional limitations on the radial gaps between the fiber and the links, designs can be made to allow insertion of energy absorbing shields in those gaps so energy scattered by the fiber during expositions do not reach the components of the package. The hollow package also allows for putting a thin non-adhesive and/or flexible coating on the fiber section with bare glass to protect it from the environment and from potential scratching. This concept of grating writing on a pre-packaged fiber could be extended to grating writing on fiber mounted on other structures, such as modules, waist region of couplers, inner waveguides of Mach-Zehnder structures and planar waveguides.

Figure 7:
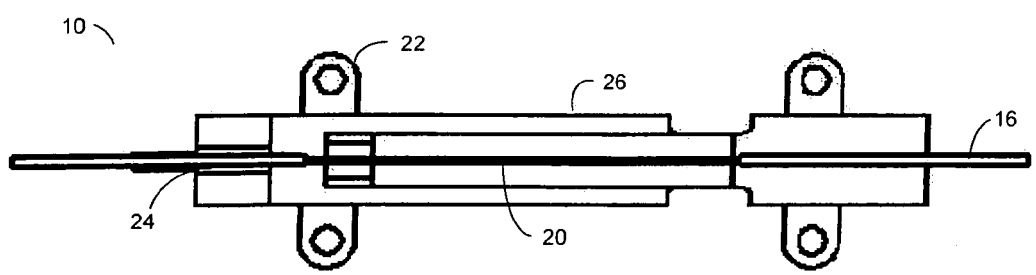
FIG. 7 is a cross-sectional view taken along lines 7—7 of FIG. 6.
Figure 6:
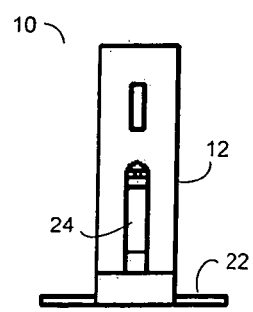
FIG. 6 is a side elevational view of the package shown at FIG. 5.

A more detailed example of an athermal package 10 according to the invention is shown in FIG. 5, FIG. 6 and FIG. 7. The substrate 12 has two identical parts that can slide against one another. Joined to each of these parts, links 14 of lower CTE are joined to the opposite side of the fiber grating 20 to transmit the thermal expansion of the outside substrate 12 to the fiber grating 20, and transform it to a thermal contraction. The two links 14 and the fiber grating 20 are located in a common imaginary plane.

When the fiber grating 20 is a Bragg grating characterized by a certain wavelength and when in use it is desired to maintain this wavelength constant over a certain temperature range in which the package 10 is expected to operate, the CTE of the links 14 and the CTE of the substrate 12 are selected such that changes in temperature will induce strain in the optical fiber grating 20 that will compensate for the temperature induced wavelength change. As a result, the wavelength of the Bragg grating will remain stable over the temperature range of interest.

To permit a better adhesion of the links 14 to the fiber grating 20, a glass insert 18 is affixed into the fiber end's part of the link 14. This way the glass fiber 16 will be fixed to a glass surface having similar physical and chemical properties. Since, in this example, the junction between links 14 and fiber 16 is made on glass to glass and the fiber grating 20 could be written after the fiber 16 and package 10 are assembled, the optical fiber 16 is stripped of all coating from one junction point to the other. One eyelet 22 is placed at the bottom front part of each half of the outside substrate 12. These eyelets 22, in combination with spring 0-rings, could be uses to provide for loose anchoring points to enable the athermal structure to float inside a mechanical protective sealed box.

With reference to FIG. 6, the optical fiber 16 passes loosely into a groove 24 in the front part of the substrate 12. The beginning of the stripped region is fixed to the glass insert 18 at the end of one of the links 14. The other end of the link 14 is soldered to the substrate 12 at a position further than the axial center of the fiber grating 20. The junction between the link 14 and the substrate 12 is made by a soldering line in a C shape using a separable solder connection, with the top and bottom part of the C axially parallel to the fiber 16. Two grooves are made on the substrate 12 to ease up solder addition or removing on the top and bottom parts of the C shaped soldering line to enable fine adjustment of the anchoring position of the link 14 to the substrate 12. Four outside eyelets are positioned near the corner of the outside substrate 12 that will serve to anchor the pre-packaged fiber to a fiber grating writing and annealing station.

With reference to FIG. 7, the C shaped front panel 26 of the substrate 12 enables the optical fiber 20 to loosely enter the package without any obstruction or risk of scrapping during its utilization. A separable solder connection is used to fix the two sliding halves of the substrate 12 together. The separable solder connection allows to move the halves of the substrate 12 with relation to one another such as to perform fine adjustments before soldering them permanently in their final position.

This example of athermal package according to the invention has a planar symmetry along the fiber axis and toward the grating axial center, so its response in a thermal gradient will match a linearized temperature at the center of the grating. The use of separable solder connection for junction points on the outside frame enables readjustments of both strain level tension in the fiber, by repositioning junction points between the two halves of the frame 12, and strain thermal slope, by repositioning junction points between the two links and the outside frame. The planar design and the low number of components ease up the assembly automation and the axially serial usage on a continuous fiber length.

A new assembly process for the athermal package according to the present example includes the following steps. For example, the fiber can be stripped and affixed to the glass inserts of the links as a first step. The second step is to anneal these junction points to stabilize them. The third step is to position and solder each link to its respective half of the substrate. The fourth step is to slide the two halves of the substrate along each other to obtain the desired strain level, and then permanently solder them together. The pre-packaged fiber is then stabilized since the fiber junction points have been annealed and ready for fiber grating writing and annealing. Grating writing and annealing can be done by exposition of part of the stripped fiber section to optical frequency electromagnetic radiation, such as a laser energy beam. The exposition is done through a window in the substrate. In the example shown in the drawings the two halves of the substrate 12 define two opposite openings that form windows that can be used for grating writing. The four eyelets near the corners of the side of the frame can be used to screw the pre-packaged fiber on a positioning plate on a laser exposition alignment set-up, where the grating can be written and stabilized, which constitutes the fifth and final step.

Optionally, thin energy absorbing shields can be inserted between the fiber and the links on the alignment set-up during laser exposition to protect the package against energy scattered by the fiber. Such energy absorbing shields can be in the form of opaque material that will prevent or at least limit scattered energy from reaching the links 14 and the substrate 12 and induce mechanical distortions in the fiber during the exposition as a result of the expansion of the links 14 and substrate 12. Advantageously, the window on the substrate through which the fiber exposition is made should be made big enough to allow the shields to be inserted through it and removed through it as well. Also a thin coating can be deposited on the bare glass section of the fiber to environmentally protect it, as long as the coating does not strain the grating either by non-adhesion between the coating and the glass or large elasticity of the coating. A possible alternative to the energy absorbing shields is to design the package such that the links 14 and the substrate are located sufficiently far from the fiber such that energy scattered from the fiber will not affect them sufficiently to cause mechanical distortions in the fiber.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A package for holding a temperature sensitive optical device, said package comprising:
   a) a substrate receiving the optical device, said substrate having a window to allow the optical device to be exposed to optical energy electromagnetic radiation to change optical properties of the optical device;
   b) a thermally compensating component mounted to the optical device and to said substrate, said thermally compensating component imposing a strain variation to the optical device in dependence of temperature: and
   c) a shield to reduce exposure of said thermally compensating component to optical energy electromagnetic radiation directed at the optical device for causing a change of the optical properties of the optical device.

2. A package as defined in claim 1, wherein said shield reduces exposure of said thermally compensating component to optical energy electromagnetic radiation scattered by the optical device when the optical device is exposed to optical energy electromagnetic radiation for causing a change of the optical properties of the optical device.

3. A package as defined in claim 2, wherein said shield is mounted between said optical device and said thermally compensating component.

4. A package as defined in claim 3, wherein said shield is removable from said package.

5. A package as defined in claim 4, wherein said shield is removable through said window.

6. A method for manufacturing a packaged optical component, comprising:
   a) placing an optical component in a substrate;
   b) making a connection between a thermally compensating link and said optical component;
   c) stabilizing said connection;
   d) exposing said optical component to optical energy electromagnetic radiation subsequent to said stabilizing to change an optical property of said optical component.

7. A method as defined in claim 6, wherein said optical component includes an optical fiber.

8. A method as defined in claim 7, wherein said exposing writes on said optical fiber a grating.

9. A method as defined in claim 7, wherein said grating is a Bragg grating.

10. A method as defined in claim 8, including affixing said thermally compensating link to said substrate.

11. A method as defined in claim 8, including annealing of said grating.

12. A method as defined in claim 10, including depositing a protective coating on said fiber after performing said exposing.

13. A method as defined in claim 11, wherein said optical energy electromagnetic radiation is laser light.

14. A method as defined in claim 6, wherein said thermally compensating link is a first thermally compensating link and said connection is a first connection, said method including making a second connection between a second thermally compensating link and said optical component and stabilizing said second connection.

15. A package manufactured by the method defined in claim 6.

16. A method for manufacturing a packaged optical component, comprising:
   a) providing:
      i) an optical component mounted on a substrate;
      ii) a thermally compensating component connected to said optical component;
   b) exposing said optical component to optical energy electromagnetic radiation to change an optical property of said optical component;
   c) shielding said thermally compensating component from optical electromagnetic radiation scattered by said optical component during said exposing.

17. A method as defined in claim 16, wherein said shielding includes placing a shield between said optical component and said thermally compensating component.

18. A method as defined in claim 17, including removing said shield subsequent to said exposing.

19. A method for manufacturing a packaged optical component, comprising:
   a) providing:
      i) an optical component mounted on a substrate;
      ii) a thermally compensating component connected to said optical component;
   b) exposing said optical component to optical energy electromagnetic radiation to change an optical property of said optical component;
   c) said thermally compensating component being located relative to said optical component such that optical electromagnetic radiation scattered by said optical component during said exposing is precluded from causing said thermally compensating component to induce a strain in said optical component.

20. A method as defined in claim 19, wherein said exposing writes a Bragg grating.

21. A package containing an optical component manufactured by the method of claim 20.

* * * * *

UNITED STATES PATENT AND TRADEMARK OFFICE
CERTIFICATE OF CORRECTION

PATENT NO. : 7,171,077 B2
APPLICATION NO. : 10/814129
DATED : January 30, 2007
INVENTOR(S) : André R. Vincelette It is certified that error appears in the above-identified patent and that said Letters Patent is hereby corrected as shown below:

Claims:
    Col. 10, line 24
➢ In claim 1, paragraph b), the colon ":" should be a semi-colon --;-- and

Col. 10, line 59
➢ In claim 9, the number "7" should be the number --8--

Signed and Sealed this

Fifteenth Day of May, 2007

JON W. DUDAS
*Director of the United States Patent and Trademark Office*